United States Patent

Sarma

[11] Patent Number: 5,854,425
[45] Date of Patent: Dec. 29, 1998

[54] METHOD FOR MEASUREMENT AND COMPENSATION OF A TIME CONSTANT FOR A CONSTANT VOLTAGE ANEMOMETER

[75] Inventor: Garimella Ramakrishna Sarma, Newport News, Va.

[73] Assignee: Tao of Systems Integration, Inc., Williamsburg, Va.

[21] Appl. No.: 94,336

[22] Filed: Jun. 9, 1998

[51] Int. Cl.[6] .................................................. G03F 1/68
[52] U.S. Cl. ........................................................ 73/204.18
[58] Field of Search .......................... 73/204.14, 204.15, 73/204.17, 204.18, 204.19

[56] References Cited

U.S. PATENT DOCUMENTS

| | | | |
|---|---|---|---|
| 2,583,561 | 1/1952 | General et al. | 73/204 |
| 3,246,515 | 4/1966 | Martino et al. | 73/204 |
| 3,464,269 | 9/1969 | Froger | 73/204 |
| 4,217,910 | 8/1980 | Khalil | 128/670 |
| 4,357,829 | 11/1982 | Kraus et al. | 73/204 |
| 4,672,847 | 6/1987 | Uchiyama et al. | 73/204 |
| 4,727,751 | 3/1988 | Holmes et al. | 73/147 |
| 4,831,876 | 5/1989 | Porth et al. | 73/204.16 |
| 4,833,912 | 5/1989 | Ohta et al. | 73/118.2 |
| 4,907,446 | 3/1990 | Inada et al. | 73/204.18 X |
| 5,036,702 | 8/1991 | Akamatsu et al. | 73/204.18 X |
| 5,074,147 | 12/1991 | Sarma | 73/204.15 |
| 5,181,420 | 1/1993 | Suzuki et al. | 73/204.18 X |
| 5,209,111 | 5/1993 | Agarwal et al. | 73/147 |
| 5,226,319 | 7/1993 | Suzuki | 73/204.18 X |
| 5,237,523 | 8/1993 | Bonne et al. | 73/204.18 X |
| 5,263,369 | 11/1993 | Cutler | 73/204.18 X |
| 5,317,910 | 6/1994 | Steinbrenner et al. | 73/204.18 X |
| 5,493,100 | 2/1996 | Renger | 73/204.18 X |

*Primary Examiner*—Elizabeth L. Dougherty
*Attorney, Agent, or Firm*—Raymond L. Greene, Esq.

[57] ABSTRACT

A method for compensating for the time constant (delay time) of hot-wire/hot-film in a constant voltage anemometer is provided. The method is a two-part series of steps, the first series for measuring the time constant in a particular wind tunnel setup and a second series for compensating for the measured time constant. The first series or measuring steps include setting up a hot-wire/hot film for a particular test at a specific operating point. A step increase in sensor current is applied and the resistance change of the sensor is measured. The time to reach 63% of the final resistance value is recorded. (The time constant is defined as the time to reach 63% of the resistance value). The measured time constant value is used to match the time constant in the CVA circuit.

11 Claims, 7 Drawing Sheets

METHOD FOR MEASUREMENT AND COMPENSATION OF A TIME CONSTANT FOR A CONSTANT VOLTAGE ANEMOMETER

FIELD OF THE INVENTION

The invention is related to the flow measuring apparatus field and in particular to control circuitry for the Constant Voltage Anemometer.

BACKGROUND OF THE INVENTION

Constant voltage anemometers (CVA's) are known devices, which comprise a first and second impedance, connected in series in a negative feedback loop of operational amplifier. A hot-film (or wire) sensor is connected between the first and second impedances to a ground. Using this refinement (over earlier constant temperature or constant current anemometers), advantages are obtained in greatly reducing setup and adjustment times for wind tunnel or in-flight testing. Additional problems remain, however. For example, the slow sensor response time effectively reduces the bandwidth of sensors, thereby preventing accurate measurement of oscillatory or rapidly changing flow conditions. Because local flow conditions in a boundary layer are typically oscillatory and may be highly transitory, rapid sensor response and wide bandwidth is necessary to measure actual flow.

The sensors (hot-wire and hot-film) used in anemometers (for the measurement of fluid flow parameters like mass flow and temperature and their fluctuations with time) have thermal inertia associated with them because of heat storage in the sensor. This thermal inertia retards the speed of response (reducing bandwidth) of the hot-wire or hot-film to changes in mass flow or temperature fluctuations with time. The thermal inertia of the sensor is quantified by the parameter "time constant" at the operating point of the sensor. A means is needed for measuring and compensating for the delay represented by the time constant, thereby increasing the effective response time of the sensor.

SUMMARY OF THE INVENTION

It is an object of this invention to provide a means for measuring the time constant of a particular constant voltage anemometer.

It is another object of the invention to provide a means for compensating for the time constant of a particular constant voltage anemometer.

Accordingly, the invention is a two-part method, first for measuring, and second for compensating for the time constant of a particular constant voltage anemometer in a particular test setup at a specific operating point. Once a test setup is complete, a step increase in sensor current is applied and the associated resistance change of the sensor is measured. The time to reach 63% of the final resistance value is recorded. Thereafter, a determination and elimination of voltage changes in CVA circuit is completed. Elimination of the CVA circuit changes is accomplished by use of an equivalent model circuit having periodic matching to the CVA. With the value of time constant obtained after elimination of the CVA circuit changes, a compensating circuit is formed by dividing the resistance load $R_2$ into loads $R_a$ and $R_b$ and inserting a compensating capacitor at their junction. This new circuit changes the response of the CVA so that the time constant of the hot-wire/hot-film sensor is compensated for at the specific operating point.

BRIEF DESCRIPTION OF THE DRAWINGS

The foregoing objects and other advantages of the present invention will be more fully understood from the following detailed description and reference to the appended drawings wherein.

DETAILED DESCRIPTION OF THE INVENTION

Figure 1:
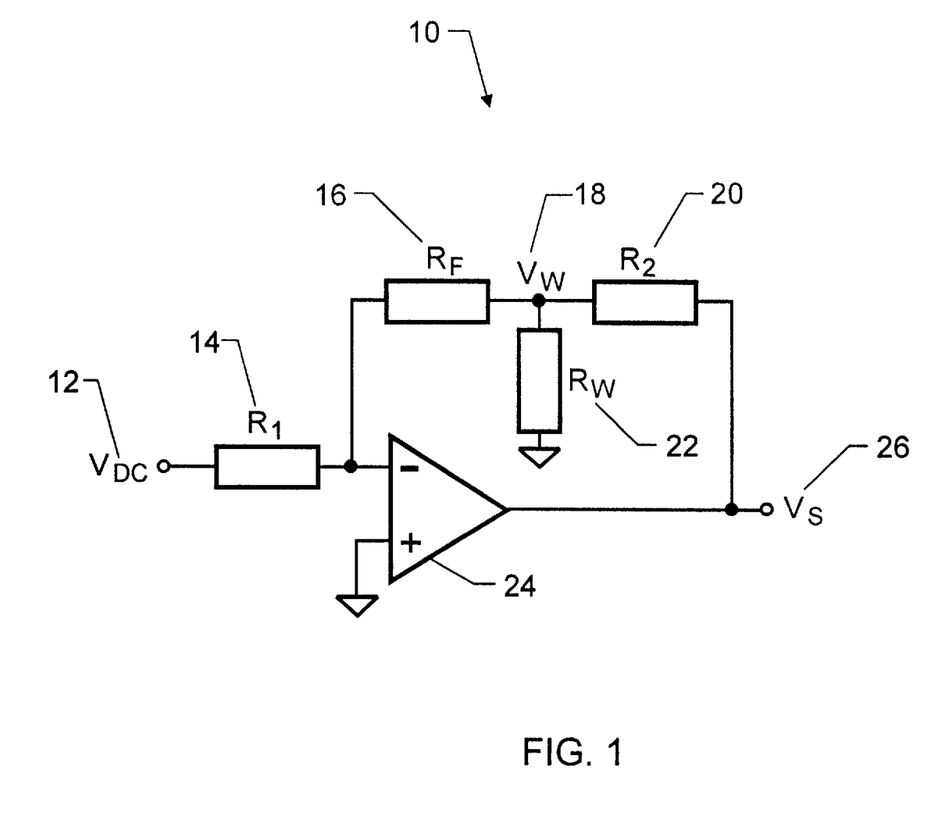
FIG. 1 is an electrical circuit diagram of a basic uncompensated constant voltage anemometer.

Referring now to FIG. 1, a basic uncompensated constant voltage anemometer circuit, designated generally by the reference numeral 10, is shown with its major components. The basic circuit 10 receives an input voltage 12 through an initial impedance 14 which is connected to the negative feedback loop of the anemometer. This loop comprises an impedance 16 and an impedance 20 connected in series forming a junction 18 to which the hot-film or hot-wire sensor 22 is connected. Although setup and calibration times are greatly reduced by the circuit, the delayed response of the sensor (known as the time constant or sensor time delay) increases the response time of the circuit thereby effectively reducing its bandwidth. The method of this invention compensates for the circuit time constant in two series of steps. These steps include a first series for measuring the time constant of the hot-wire or hot-film used with the CVA, and a second series for developing an efficient internal compensation within the CVA for the time constant. When current changes are made to a CVA both the CVA circuit and the sensor provide voltage and impedance changes. Because the CVA circuit changes are large compared to the sensor changes, it is necessary to remove these large changes from the measured values in order to accurately identify the sensor-induced changes. Removal of the CVA circuit changes is accomplished by adding an equivalent model circuit to the basic CVA circuit, the model circuit having periodic matching to the basic CVA. With the time constant values obtained after removal of the CVA circuit effects, a compensating circuit is adjusted. Using these new values, the resistor on the output side of the hot-film sensor is replaced with two new series resistors having a capacitor connected at the junction of the new resistors. The new circuit changes the response of the constant voltage anemometer so that the time constant is compensated at the specific operating point.

The time constant of the sensor when it is used in the CVA must be measured (ideally) at the specific operating point of the CVA in the test setup. The time constant is measured by measuring resistance change in the sensor resistance due to a step change in the sensor current. The time to reach 63% of the final resistance value due to a step change in the sensor current is known as the time constant. The resistance change is an exponential function. The step change in wire current also produces an independent change in the CVA circuit depending on its component values. The actual CVA output is the sum of these two changes. However, the changes in the output due to changes in the wire resistance are small compared to those from the circuit components. To remove the changes due to the circuit from the output, periodic matching of the CVA with an equivalent model circuit is done. The difference output of the model and the CVA will be due to the step response of the wire alone. This can be understood from the following explanations. It can easily be shown that $$\Delta V_s = \left[ 1 + \frac{R_2}{R_F} + \frac{R_2}{R_W} \right] \Delta V_W - \frac{R_2}{R_W^2} V_W \Delta R_W \qquad (1)$$

In the above equation, the first part of the change in $V_s$ is due to circuit response to $\Delta V_w$ itself and the second part of the equation is the change in sensor resistance $\Delta R_w$ due to step change in $V_w$. Normally the magnitude of the first part in the equation (1) is large compared to the second part. Therefore in order to make a measurement of the sensor time constant, the first part (the circuit part) of the equation (1) has to be canceled at the actual operating point of the CVA to discern the changes due to $R_w$.

Figure 2:
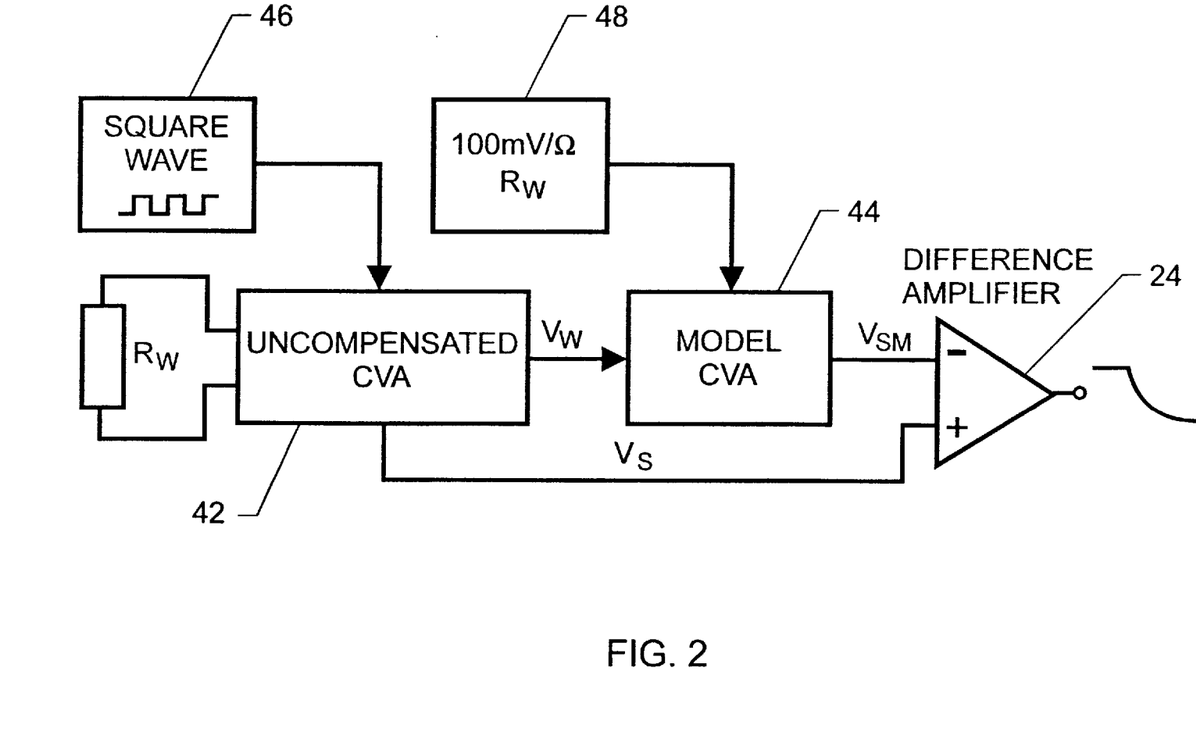
FIG. 2 is an electrical circuit diagram of a constant voltage anemometer circuit modified to provide measurements of the basic time constant.

This cancellation is accomplished by the model matching shown in FIG. 2. Using a model CVA connected to uncompensated constant voltage anemometer 42, a measurement of the circuit changes due to the CVA 42 (as opposed to circuit changes due to the sensor alone $R_w$), is determined by the use of an input square wave 46. The model CVA, (which cancels out the CVA circuit changes) is itself adjusted by impedance 48. $V_w$ from the CVA 42 is also given to the model CVA 44 and a voltage proportional to instantaneous $R_w$ is searched until the model output matches the actual CVA output. Thus, at the differential amplifier output, the voltage will be due to the change in sensor resistance only.

Figure 3:
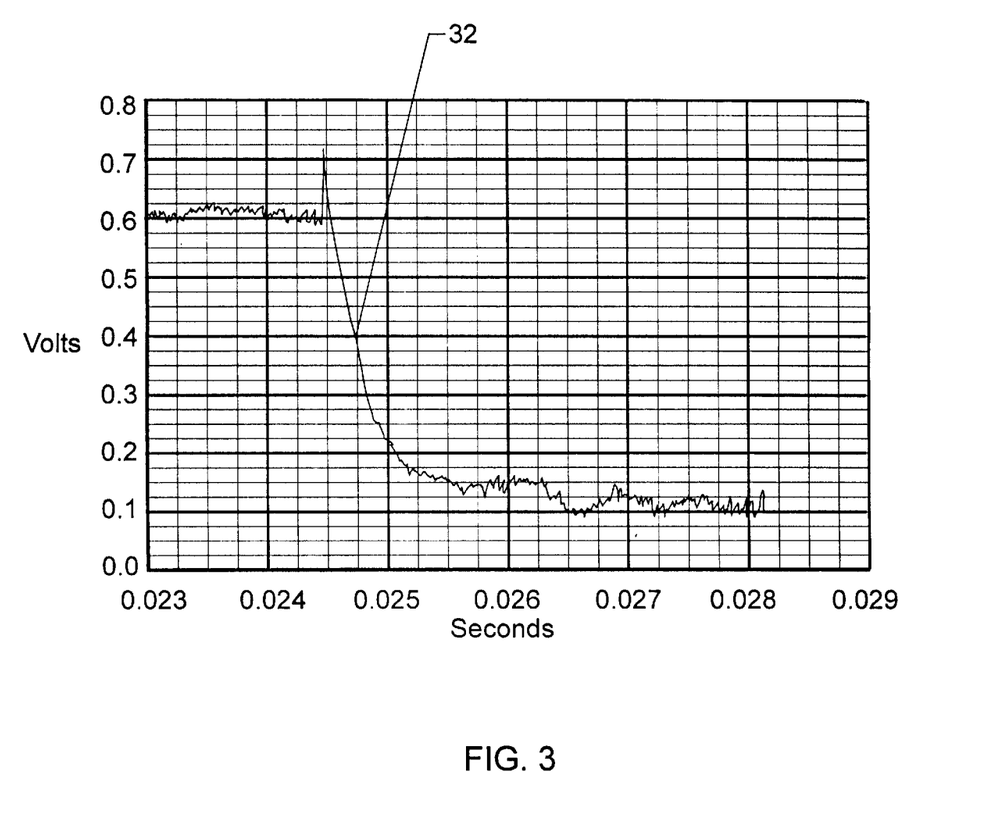
FIG. 3 is a graph depicting experimental results of a step response of a five-micron, hot-wire in a boundary layer at a Reynold's Number of 19.
Figure 4:
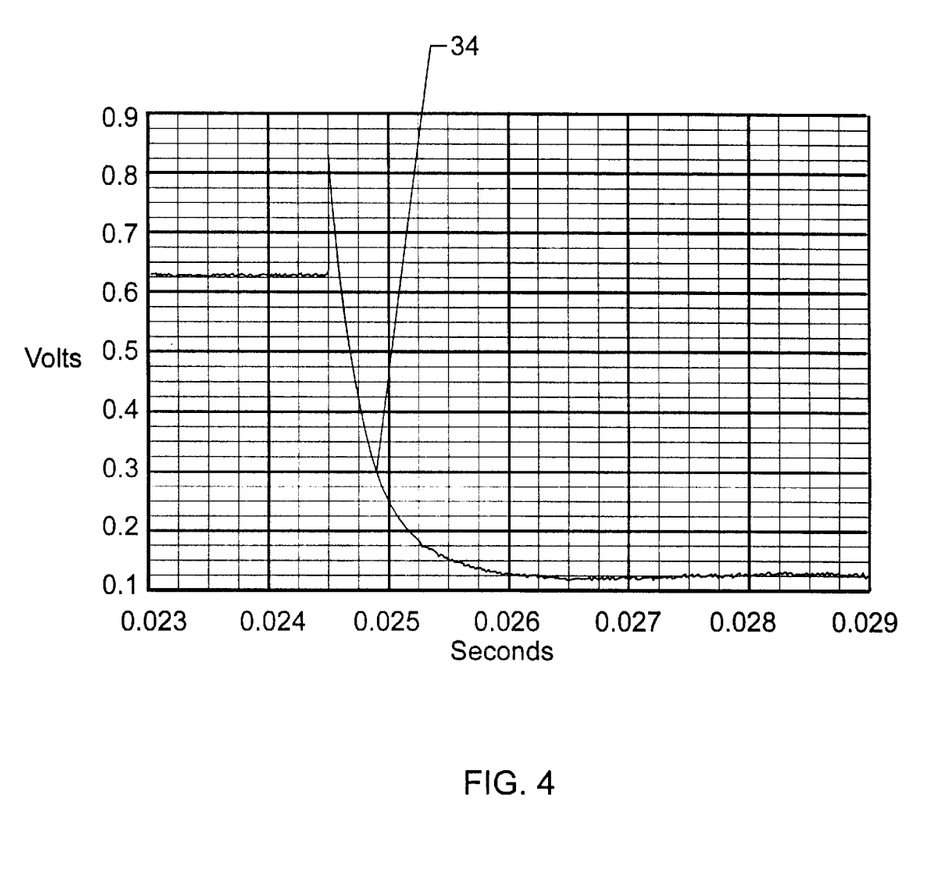
FIG. 4 is a graph of the averaged step response of the time constant measuring circuit.
Figure 5:
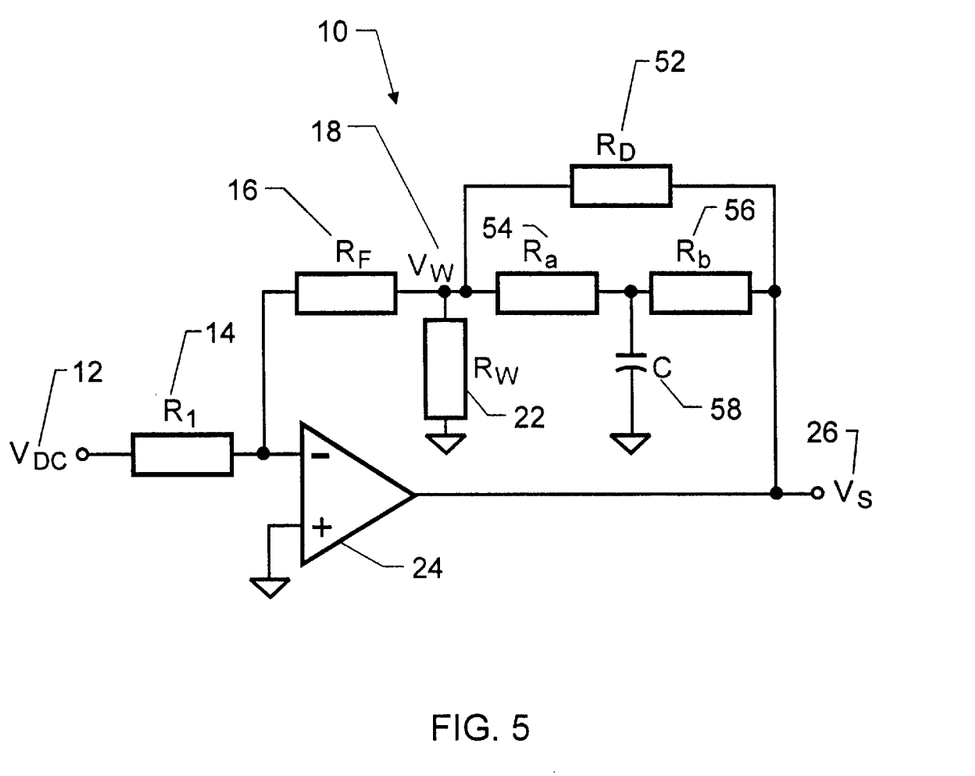
FIG. 5 is an electrical circuit diagram of the compensated constant voltage anemometer circuit.

Typical response waveforms due to change in the sensor resistance obtained from this circuit arrangement are shown in FIGS. 3 and 4. A typical response from a five micron hot-wire in the boundary layer at a midstream wire Reynold's number of 19 is shown in FIG. 3, where turbulence disturbances are seen in the wave-form. However, the average response of sixteen such samples is shown in FIG. 4 from which the time constant can easily be measured as 0.29 milliseconds even in the presence of turbulence in the boundary layer. The effect of the time constant of the sensor on the basic CVA circuit is to produce a response governed by the following equation $$V_s = \frac{k}{\sqrt{1 + (\omega \tau)^2}} u \qquad (2)$$

where $V_s$ is the output, k the proportionality constant and u is the fluid parameter. $\omega$ is the radian frequency and $\tau$ is the time constant of the sensor. Having measured the time constant with the method described above, it becomes necessary to compensate for the time constant to increase the bandwidth of the CVA. This compensation is accomplished by modifying the basic CVA as shown in FIG. 5.

The basic circuit is modified by splitting the $R_2$ into $R_a$ 54 and $R_b$ 56 and inserting the compensating capacitor 58 at their junction as shown. The combination of $R_a$ 54 and $R_b$ 56 with C 58 will modify the response as $$V_s = K \frac{\sqrt{1 + (\omega \tau_c)^2}}{\sqrt{1 + (\omega \tau)^2}} u \qquad (3)$$

where $$\tau_c = \frac{R_a R_b}{R_a + R_b} c \qquad (4)$$

the quantity $\tau_c$ is the compensation zero introduced by the above combination. Thus by making proper choice of values to match $\tau_c$ and $\tau$ the time constant is cancelled, thereby increasing the bandwidth of the CVA.

Figure 6:
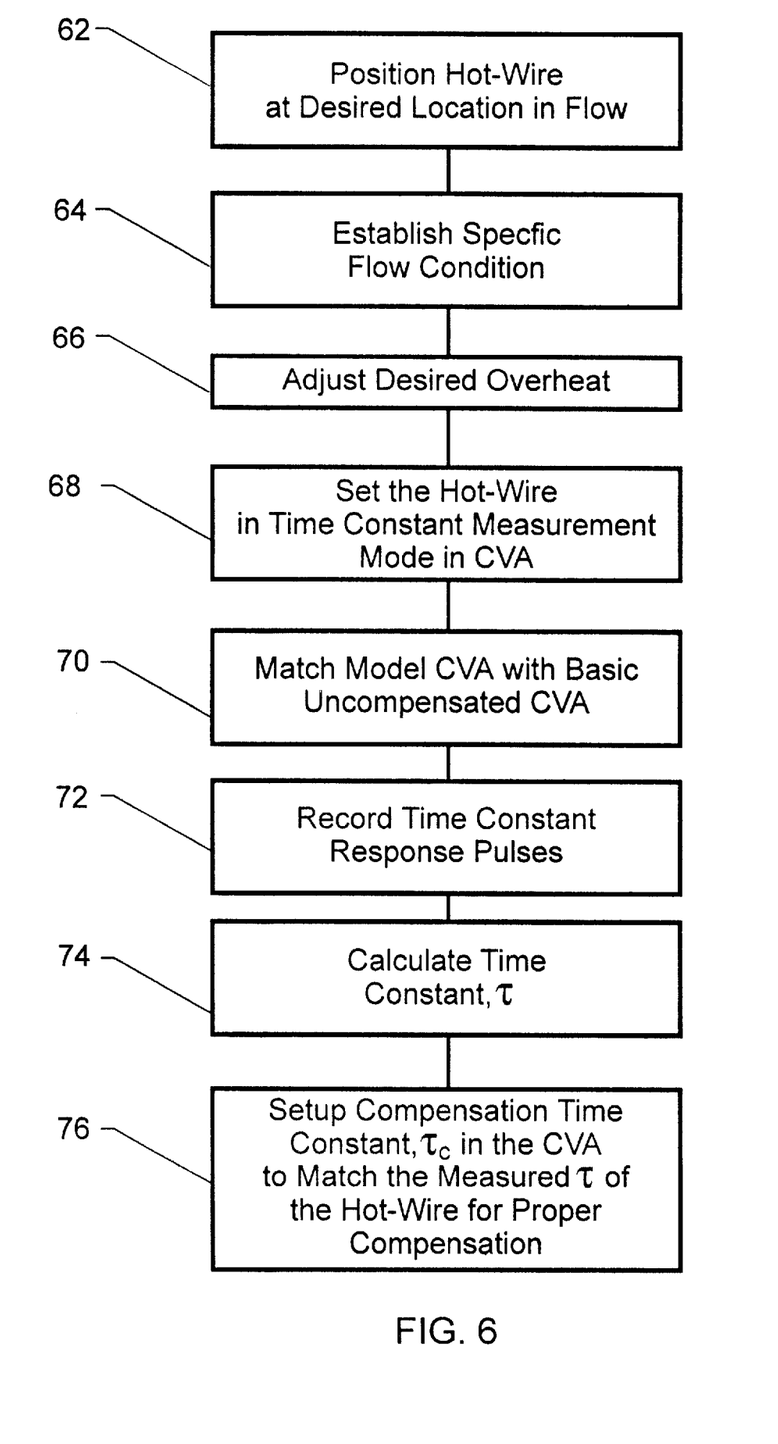
FIG. 6 is a flow diagram depicting the steps of the method of compensating for a time constant in a constant voltage anemometer.

FIG. 6 depicts the sequence of steps required, first, to measure the CVA circuit time constant and, second, to compensate for the time constant at a specific flow condition (i.e., speed, Reynold's number, etc.). The method begins with the step 62 of positioning the hot-wire at the desired location in the flow. After the location positioning is determined, the step 64 of turning on the flow and setting the specific flow parameters. After the flow is set, the step 66 of adjusting the desired overheat is accomplished. Overheat is defined as the ratio of hot-wire heated resistance to its cold resistance at the ambient temperature. After the adjustment of the overheat, the step 68 of setting the hot-wire in time constant measurement mode takes place. After setting the hot wire, the step 70 of matching the model CVA with the basic (uncompensated) CVA. Thereafter, the step 72 of recording the time constant response pulses and step 74 of calculating the time constant are completed. Finally, step 76 concludes the method by setting the value on the compensation time constant of the constant voltage anemometer.

Figure 7:
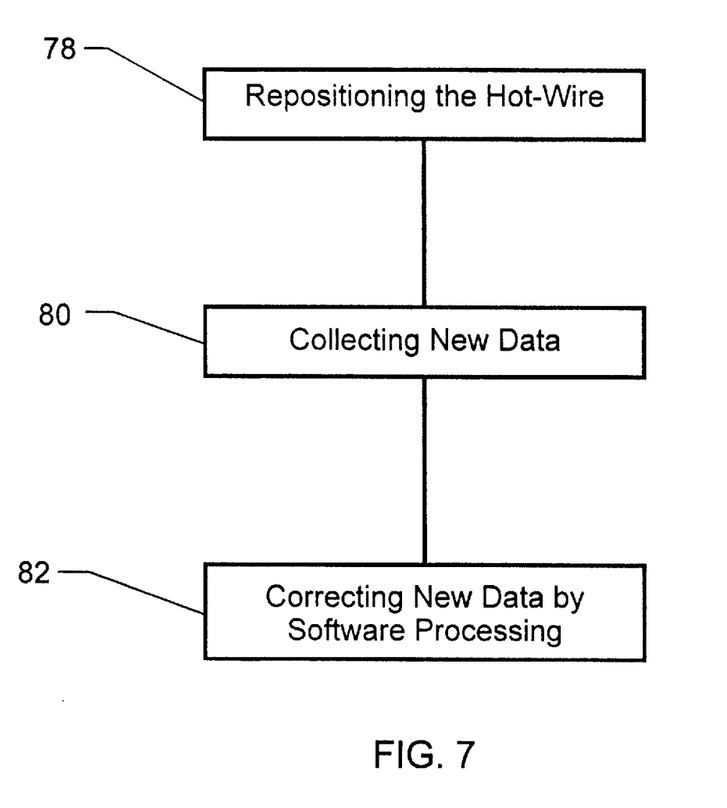
FIG. 7 is a flow diagram depicting a continuation of the method for collecting data from multiple flow locations without the need for rematching time constants.

Referring now to FIG. 7, when the hot-wire is repositioned, step 78, it is not necessary to rematch $\tau_c$ with $\tau$. Instead, data can be collected, step 80, using an original setting for $\tau_c$ and then in post test processing, the collected data can be corrected using software, step 82. The measured output voltage of the CVA, denoted by $e_{cva}$ can be corrected by $$e_c = e_{cva} \left[ \frac{1 + \tau s}{1 + \tau_c s} \right] \qquad (5)$$

at all measured time constants, $\tau$. By using the above-referenced software correction, it is possible to collect hot-wire data measurements at differing locations and flow conditions without the need to rematch $\tau_c$ with $\tau$ during the test.

The features and advantages of the invention are numerous. The hot-wire/hot-film time constant is fully compensated, thereby increasing the bandwidth available for the sensor. Although these circuit changes permit only compensation for a particular test setup at a particular setup point, the compensated circuit allows the sensor to detect unsteady and oscillatory boundary layer flow with high dynamic response. This type of unsteady and oscillatory boundary layer flow could not previously be measured using hot-film/hot-wire sensor devices.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A method for compensating a constant voltage anemometer for sensor time delay comprising the steps of:

providing a test setup of a basic uncompensated constant voltage anemometer circuit having a sensor;

measuring the time constant of the sensor of said constant voltage anemometer test setup at a specific operating point;

canceling the constant voltage anemometer circuit changes to the time constant output leaving only the sensor portion of the time constant in the output;

adding a circuit compensator to the original constant voltage anemometer setup;

setting a circuit compensator to match the time constant of the sensor, thereby providing a compensated constant voltage anemometer; and collecting experimental data, said data being the output of said compensated constant voltage anemometer.

2. A method for compensating a constant voltage anemometer for sensor time delay as in claim 1 wherein said step of measuring the time constant comprises positioning hot-wire at a desired test location in a flow stream.

3. A method for compensating a constant voltage anemometer for sensor time delay as in claim 2 wherein said step of measuring the time constant further comprises establishing a specific flow condition at a specific Reynold's number.

4. A method for compensating a constant voltage anemometer for sensor time delay as in claim 2 wherein said step of measuring the time constant further comprises providing a step input of a square wave voltage.

5. A method for compensating a constant voltage anemometer for sensor time delay as in claim 1 wherein said step of canceling the constant voltage anemometer circuit contribution comprises setting up an equivalent model circuit having periodic matching to the actual CVA.

6. A method for compensating a constant voltage anemometer for sensor time delay as in claim 5 wherein said step of canceling the constant voltage anemometer circuit further comprises measuring the time constant of the circuit having an equivalent model circuit adding and subtracting that time constant from the time constant of the unmodified circuit, thereby leaving only the time constant change due to the hot-film/hot-wire sensor in the output.

7. A method for compensating a constant voltage anemometer for sensor time delay as in claim 1 wherein said step of setting a circuit compensator comprises arranging two resistors set up in series having a compensating capacitor at their junction.

8. A method for compensating a constant voltage anemometer for sensor time delay as in claim 1 wherein said step of adding comprises removing the resistor on the sensor output side and replacing such resistor with the circuit compensator.

9. A method for compensating a constant voltage anemometer for sensor time delay as in claim 1 comprising the further step of repositioning hot-wire at a desired test location in a flow stream.

10. A method for compensating a constant voltage anemometer for sensor time delay as in claim 9 comprising a further step of recollecting experimental data from said compensated constant voltage anemometer.

11. A method for compensating a constant voltage anemometer for sensor time delay as in claim 10 comprising a further step of matching the time constant $\tau_c$ with $\tau$ during post-test processing using a software correction.

* * * * *